(12) United States Patent
Chenna

(10) Patent No.: US 9,083,531 B2
(45) Date of Patent: Jul. 14, 2015

(54) PERFORMING CLIENT AUTHENTICATION USING CERTIFICATE STORE ON MOBILE DEVICE

(71) Applicant: Symantec Corporation, Mountain View, CA (US)

(72) Inventor: Srinivas Chenna, Bangalore (IN)

(73) Assignee: Symantec Corporation, Mountain View, CA (US)

( * ) Notice: Subject to any disclaimer, the term of this patent is extended or adjusted under 35 U.S.C. 154(b) by 252 days.

(21) Appl. No.: 13/652,575

(22) Filed: Oct. 16, 2012

(65) Prior Publication Data

US 2014/0108810 A1    Apr. 17, 2014

(51) Int. Cl.
*H04L 29/06* (2006.01)
*H04L 9/32* (2006.01)
*H04L 9/00* (2006.01)
*H04W 12/06* (2009.01)
*H04L 9/18* (2006.01)
*H04W 12/10* (2009.01)

(52) U.S. Cl.
CPC ............. *H04L 9/321* (2013.01); *H04L 9/3247* (2013.01); *H04L 9/3263* (2013.01); *H04L 9/3271* (2013.01); *H04W 12/06* (2013.01); *H04L 9/00* (2013.01); *H04L 9/18* (2013.01); *H04L 9/3281* (2013.01); *H04L 63/0428* (2013.01); *H04L 63/08* (2013.01); *H04L 63/0823* (2013.01); *H04L 2209/34* (2013.01); *H04L 2209/80* (2013.01); *H04W 12/10* (2013.01)

(58) Field of Classification Search
CPC . H04L 63/0823; H04L 63/08; H04L 63/0428; H04L 9/3281; H04L 9/18; H04L 9/00
USPC ........... 713/179, 156, 168, 176; 380/262, 264
See application file for complete search history.

(56) References Cited

U.S. PATENT DOCUMENTS

| | | | |
|---|---|---|---|
| 2008/0016307 A1* | 1/2008 | Takano et al. | 711/164 |
| 2012/0308003 A1* | 12/2012 | Mukherjee | 380/243 |
| 2013/0145151 A1* | 6/2013 | Brown et al. | 713/156 |
| 2013/0152176 A1* | 6/2013 | Courtney et al. | 726/5 |
| 2013/0247218 A1* | 9/2013 | Jhingan et al. | 726/27 |
| 2014/0085309 A1* | 3/2014 | Czapar | 345/441 |

OTHER PUBLICATIONS

Lee, M. "Open sesame: Google's no-password log-in", Jan. 17, 2012. http://www.zdnet.com/open-sesame-googles-no-password-log-in-1339329832/.
U.S. Appl. No. 13/900,929, entitled "Performing Client Authentication Using Onetime Values Recovered From Barcode Graphics", filed May 23, 2013.

* cited by examiner

*Primary Examiner* — Aravind Moorthy
(74) *Attorney, Agent, or Firm* — Patterson & Sheridan LLP

(57) ABSTRACT

Techniques are disclosed for authenticating users to a computing application. A relying application transmits a login page to a user requesting access to the application. The login page may include a QR code (or other barcode) displayed to the user. The QR code may encode a nonce along with a URL address indicating where a response to the login challenge should be sent. In response, the user scans the barcode with an app on a mobile device (e.g., using a camera on a smart phone) to recover both the nonce and the URL address. The mobile device may also include a certificate store containing a private key named in a PKI certificate. The app signs the nonce using the private key and sends the signed nonce in to the URL in a response message.

19 Claims, 7 Drawing Sheets

PERFORMING CLIENT AUTHENTICATION USING CERTIFICATE STORE ON MOBILE DEVICE

BACKGROUND

1. Field

Embodiments of the invention generally relate to techniques for authenticating users in accessing computing applications. More specifically, techniques are disclosed for performing user authentication using a certificate store on a mobile device and using a barcode scanner.

2. Description of the Related Art

Protecting access to computing systems is a well known issue in a broad variety of contexts. For example, it is common for a computing application to require users to provide a username and password. As more computing applications are accessed in a distributed manner, e.g., by accessing applications hosted in a cloud based environments, simple passwords frequently provide inadequate security. That is, passwords suffer from a number of known drawbacks, primarily in that they may be forgotten, guessed, or otherwise disclosed or obtained. For example, users frequently choose insecure passwords that can be broken using a "dictionary" attack.

To improve security, and provide more reliable authentication mechanisms, a variety of cryptographic techniques have been developed. For example, public key infrastructure (PKI) techniques are used to create, distribute, and manage cryptographic keys used to control access to an application. However, PKI approaches are often perceived as being extremely difficult to deploy and use, and this notion has become a deterrent for adopting this technology. Further, the reputation of being very complex to administer and deploy is not unwarranted. PKI provides a number of challenges, particularly for applications that can be accessed from anywhere, e.g., an application deployed on a computing cloud. In such a case, a user may require access to their certificates from different computing devices, but a certificate installed on one computer cannot be used from other devices without copying the private key to each device. This prevents the "on demand from anywhere" access desired for some applications. Installing a certificate (and private key) on a hardware token gives the flexibility to access the certificate store from multiple computers, but the requirements of an available of USB interface and ability to install device drivers on a given machine can limit this flexibility. Further, managing certificate life-cycle is a difficult task because of various combinations of browsers, operating systems, certificate and key stores and device drivers involved (particularly, if hardware tokens are involved).

SUMMARY

Embodiments presented herein include a method for authenticating a user requesting access to a computing resource. This method may generally include receiving, over a first network connection, a request from a client device to access an application and generating, by operation of a processor, a nonce to encode in a barcode graphic. This method may also include sending, over the first network connection, the barcode graphic to the client device and receiving, over a second network connection, a response which includes a digital signature signing the nonce. Upon determining the digital signature is valid, the client device is granted access to the application.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
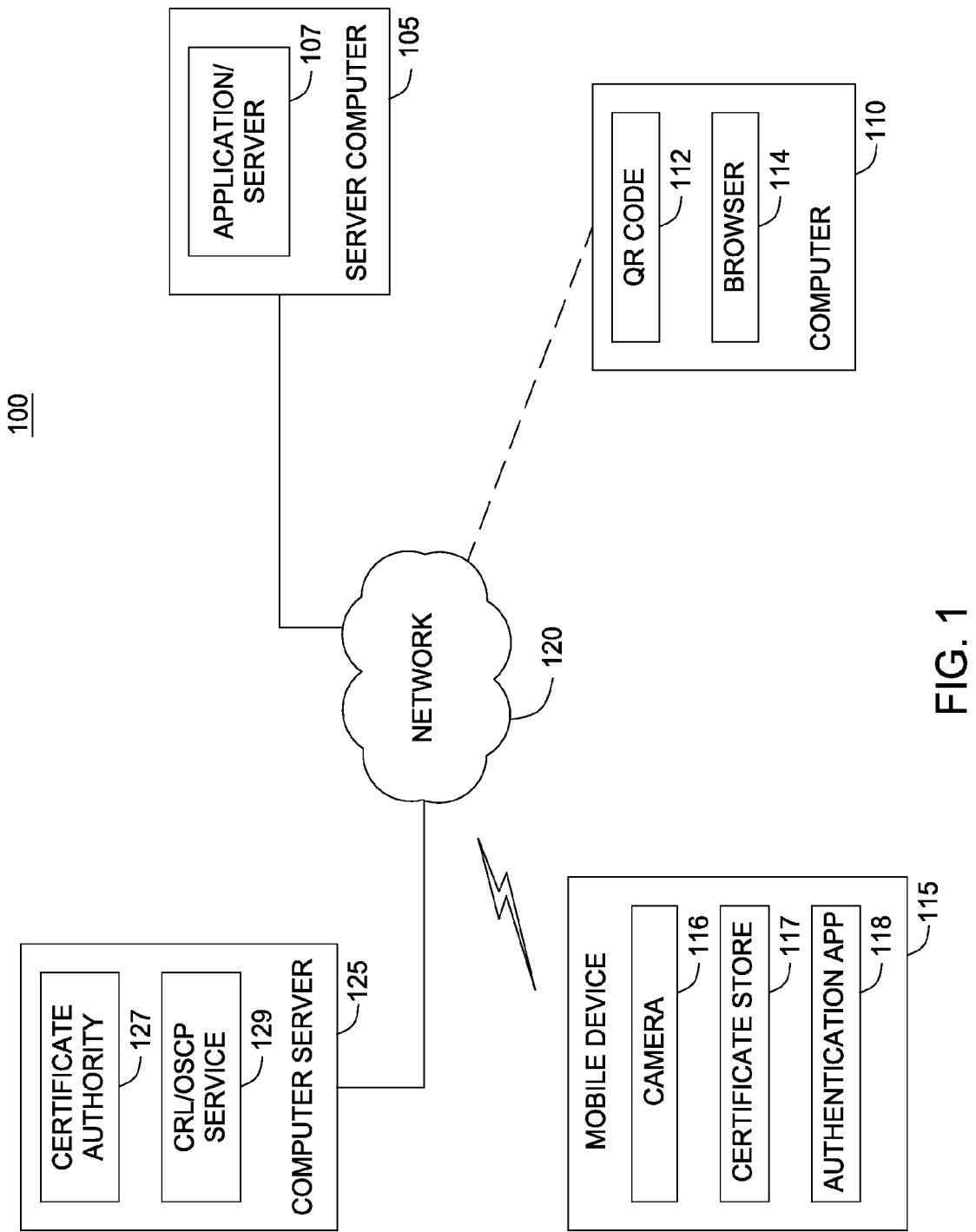
FIG. 1 illustrates an example computing environment, according to one embodiment.

Embodiments presented herein provide techniques for authenticating users accessing computing applications hosted in a cloud environment. The techniques disclosed herein allow users to authenticate themselves using virtually any computing device that can access the cloud based application. That is, the authentication process described herein can be performed "on demand from anywhere," while providing a cryptographically secure process resistant to a variety of attacks. In one embodiment, a relying application transmits a login page to a user requesting access to the application. The login page may include a QR code (or other barcode) displayed to the user. The QR code may encode a nonce along with a URL address indicating where a response to the login challenge should be sent. In response, the user scans the barcode with an app on a mobile device (e.g., using a camera on a smart phone) to recover both the nonce and the URL address. The mobile device may also include a certificate store containing a private key named in a PKI certificate. The app signs the nonce using the private key and sends the signed nonce in to the URL in a response message. The relying application can then validate the signature. Specifically, the relying application may confirm that the nonce was signed using the private key corresponding to the public key named the PKI certificate associated with the user. Optionally, the relying application may also validate the user's certificate with a certificate authority.

Storing the certificate in a mobile device allows a user to access a private key needed to perform the authentication challenge, regardless of the computing device being used to access the cloud based application. And the QR code allows the challenge to be provided to the mobile device, without requiring any network or data communication. Accordingly, this approach does not require that the computing device have correct set of device drivers for a hardware token or require installing a copy of the accessing user's private key on each device used to access the cloud based application. Thus, the techniques disclosed herein provide an authentication process that allows users to access cloud based applications in cases where it is unknown where users will be accessing the cloud based application from or what systems they will be using to access the cloud based application.

In the following, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet. In context of the present invention, a cloud based application may be configured to provide an authentication challenge to users in the form of a nonce encoded in a QR code. In response, a user recovers the nonce using a barcode scanner and signs the nonce using a private key stored on a mobile device. The signed message is then transmitted to the relying application in the cloud (whether the cloud itself is provided by the enterprise or a third party). Also note, while described herein using a QR code to encode a nonce and URL as part of the authentication challenge as a reference example, one of ordinary skill in the art will recognize that any barcode or graphical symbols capable of encoding both the nonce and URL may be used.

FIG. 1 illustrates an example computing environment 100, according to one embodiment. The computing environment 100 allows a user to perform a client authentication process using a certificate in a certificate store 117 on mobile device 115. As shown, the computing environment includes a server computer 105 hosting a computing resource (e.g., application/service 107). The server computer 105 may be a physical computing system (e.g., a system in a data center) or may be a virtual computing instance executing within a computing cloud. In any event, the computing system 105 hosts an application/service 107 (also referred to as a relying application) accessed by clients using computing system 110. In one embodiment, the relying application 107 authenticates a user a by sending an authentication challenge encoded in a barcode (e.g., a QR code 112) to computing system 110 over a network 120 (e.g., the internet). In one embodiment the challenge may be rendered as a login page on browser 114 of computing system 110.

The relying application 107 may be configured with CA certificates from certificate authority 127. Doing so allows relying application to validate that a public key listed in a certificate is, in fact, associated with a given user. Further, the relying application 107 may be configured to confirm that a given user's certificate is valid and not revoked as part of the authentication process by communicating with CRL/OSCP service 129 on CA server 125.

In one embodiment, the relying application 107 authenticates a user requesting access by first generating a nonce, (e.g., a 12-byte random number). The relying application 107 encodes the nonce in a barcode a (e.g., QR code 112) along with a URL to post a challenge response message. The QR code 112 is presented to the user on a login page rendered on browser 114.

Once displayed, the user invokes an authentication app 118 installed on the mobile device 115 and points a camera 116 at the login page to capture an image of the QR code 112. The authentication app 118 recovers the nonce and URL from the scanned image of QR code 112. Once recovered, authentication app 118 signs the nonce with private key corresponding to a certificate installed in the certificate store 117. Note, a user may have to provide a password or pin to the authentication app 118 to access the private key in the certificate store 117. The signed nonce along with the user's certificate is posted to the URL recovered from the QR code over a secure channel (e.g., https).

Once received, the relying application 118 validates the user. First, the relying application 118 may validate the signature of the nonce. That is, the relying application 107 confirms that the nonce signature was created with the private key corresponding to the public key named in the user's certificate. The relying application may then validate that the certificate was, in fact, issued by a certificate authority 127 named as the issuing entity in the user's certificate. Further, the relying application may also perform a revocation check by querying an OCSP service or downloading a CRL 129 hosted by the certificate authority 127.

Based on the authentication status, the relying application 107 either grants or denies access to the requested resources on servicer 105 (e.g., cloud-based computing applications).

Figure 2:
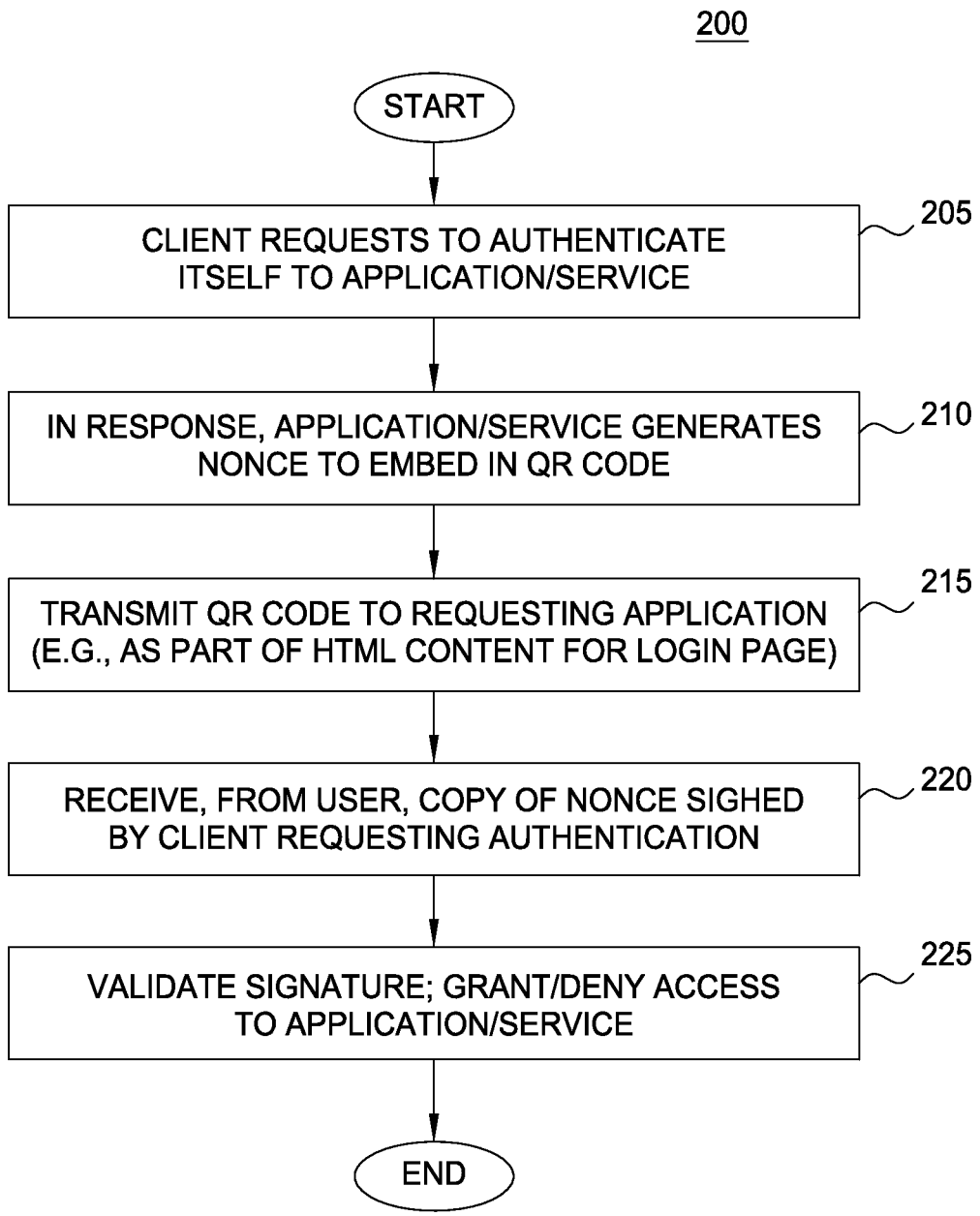
FIG. 2 illustrates a method for authenticating a user requesting access to an application, according to one embodiment.

FIG. 2 illustrates a method for a relying application to authenticate a user requesting access to the application, according to one embodiment. More specifically, method 200 illustrates the authentication process described above from the perspective of the relying application 107. As shown, the method 200 begins when an application (again, referred to as the relying application) receives an access request from a user. At step 210, the relying application generates an authentication challenge to send to the user. As noted above, the challenge may include a (i) nonce and a (ii) network address (e.g., URL), encoded in QR code. Once generated, the QR code is transmitted to the requesting application (step 2125). For example, the QR code may be transmitted as an image rendered by a web browser. At step 220, the relying application receives a copy of the nonce signed with a digital signature. The copy may be posted over the URL encoded in the QR code. The relying application may also receive a PKI certificate identifying the user requesting access. At step 225, the relying application may validate the signature as well as the certificate. As noted above, e.g., the relying application may confirm that the signature of the nonce was, in fact, created using the private key corresponding to the public key named in the certificate. Further, the relying application may also validate that the user's certificate itself is valid. For example, in one embodiment, the relying application may act as a self-signed root and simply confirm that the certificate was, in fact, one issued by the relying application. Alternatively, the relying application may have a root certificate corresponding to an external certificate authority. In such a case, the relying application may validate that the certificate is one issued by a trusted CA as well as confirm with the trusted CA that the certificate is currently valid and not revoked (e.g., by checking a certificate revocation list (CRL) or accessing an OCSP service). Once validated, the user is granted access to the relying application.

Figure 3:
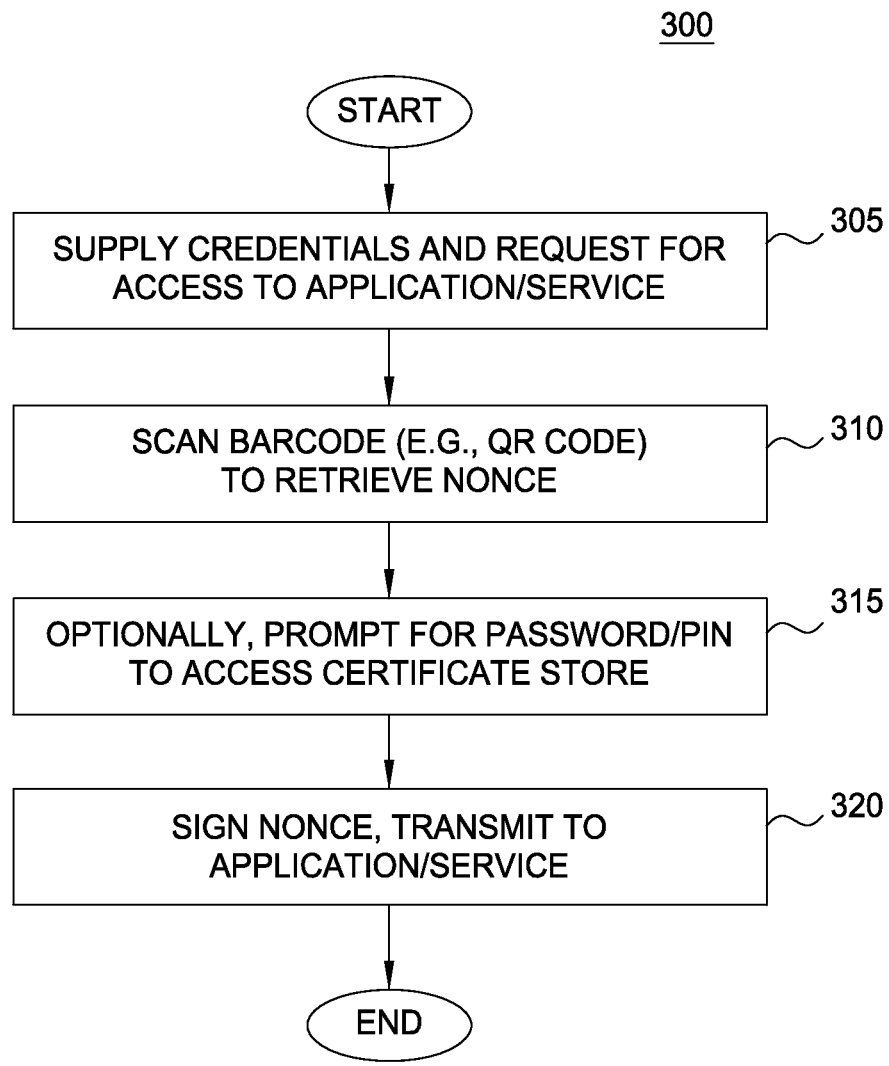
FIG. 3 illustrates a method for a mobile device to provide an authentication message to a relying application, according to one embodiment.

FIG. 3 illustrates a method 300 for a mobile device to provide an authentication message to a relying application, according to one embodiment. More specifically, method 300 illustrates the authentication process described above from the perspective of the authentication app 118 on mobile device 115. As shown, the method 300 begins at step 305, where a user requests access to an application or service accessed over a network (e.g., an application hosted in a computing cloud). In response, the relying application generates a QR code rendered on a display. At step 310, the authentication app 118 on a mobile device (e.g., a Smartphone or computing tablet) scans the QR code to recover the nonce and URL. At step 315, the authentication app (or certificate store on the mobile device) may prompt the user to supply authenticating credentials prior to accessing the private key stored on the mobile device. For example, a user may have to enter a pin code or password on the mobile device in order to access the certificate store. At step 320, the authentication app signs the nonce using the private key from the certificate store and posts the signature along with the user's certificate to the URL encoded by the QR code.

Figure 4:
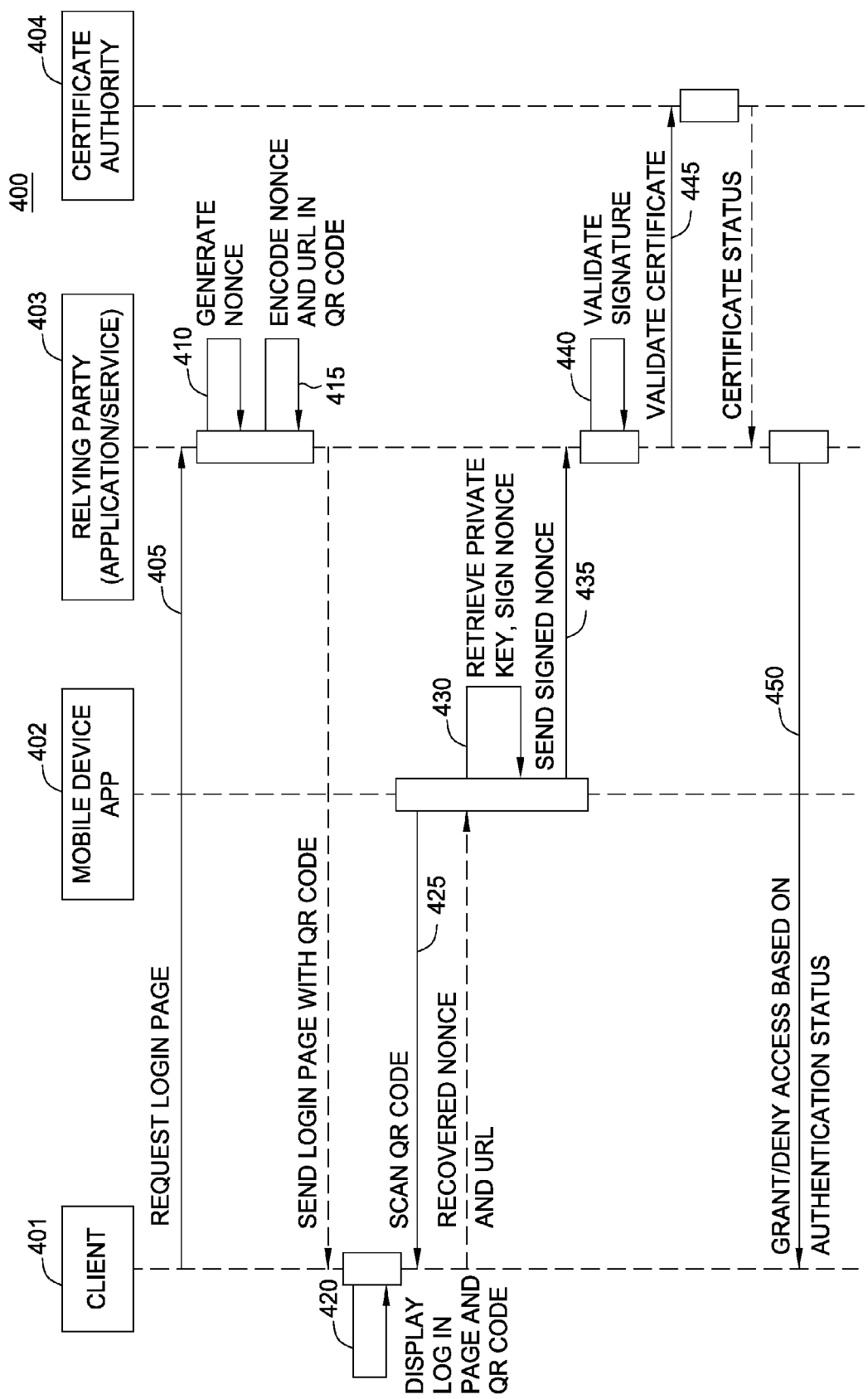
FIG. 4 illustrates a sequence diagram for authenticating a user by using a certificate store and barcode scanner on a mobile device, according to one embodiment.

FIG. 4 illustrates a sequence diagram 400 for authenticating a user a certificate store on a mobile device and using a barcode scanner, according to one embodiment. As shown, a client 401 requests a login page from a hosted application or service 403 (at 405). The application 403 generates a nonce at 410 and at 415 encodes the nonce and a URL in a QR code. The application 403 sends the QR code to the client 401. At 420, the client 401 displays the QR code. At 425, an app on the mobile device 402 scans the QR code to recover the encoded nonce and URL. At 430, the mobile device 402 retrieves a private key from a certificate store and uses it so sign the nonce. The mobile device 402 then posts the signed nonce to the application 403 (at 435). At 440, the application 440 validates the signature posted by the mobile device 402. At 445, the application 403 validates the certificate supplied by mobile device 402. Once validated, the application 403 grants access to the client 401 (at 450).

Figure 5:
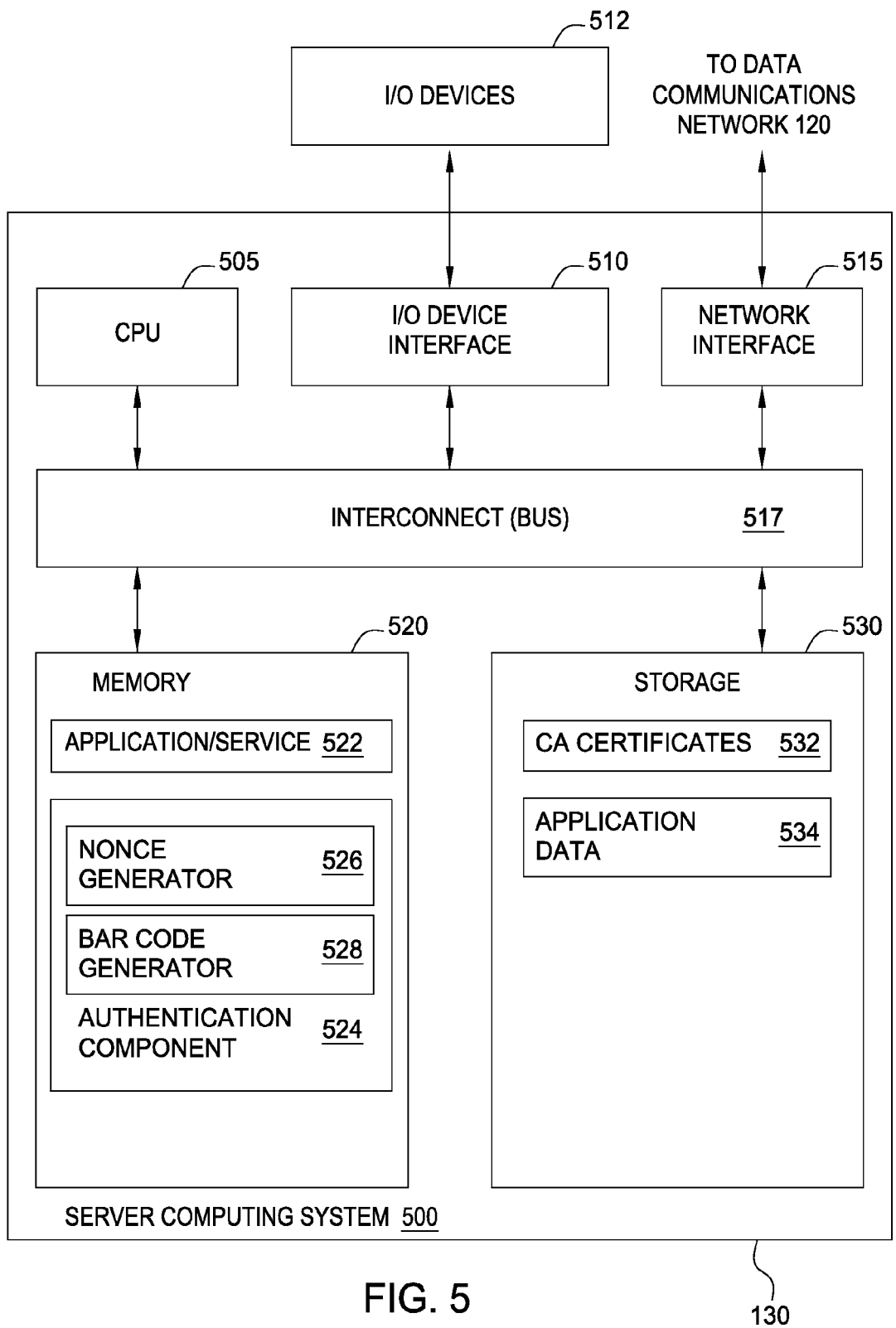
FIG. 5 illustrates an example computing system configured with a relying application configured to authenticate users with a barcode challenge, according to one embodiment.

FIG. 5 illustrates an example computing system 500 configured with a relying application configured to authenticate users with a barcode challenge, according to one embodiment. As shown, the computing system 500 includes, without limitation, a central processing unit (CPU) 505, a network interface 515, a network interface 515, a memory 520, and storage 530, each connected to a bus 517. The computing system 500 may also include an I/O device interface 510 connecting I/O devices 512 (e.g., keyboard, display and mouse devices) to the computing system 500. Further, in context of this disclosure, the computing elements shown in computing system 500 may correspond to a physical computing system (e.g., a system in a data center) or may be a virtual computing instance executing within a computing cloud.

The CPU 505 retrieves and executes programming instructions stored in the memory 520 as well as stores and retrieves application data residing in the memory 530. The interconnect 517 is used to transmit programming instructions and application data between the CPU 505, I/O devices interface 510, storage 530, network interface 515, and memory 520. Note, CPU 505 is included to be representative of a single CPU, multiple CPUs, a single CPU having multiple processing cores, and the like. And the memory 520 is generally included to be representative of a random access memory. The storage 530 may be a disk drive storage device. Although shown as a single unit, the storage 530 may be a combination of fixed and/or removable storage devices, such as fixed disc drives, removable memory cards, or optical storage, network attached storage (NAS), or a storage area-network (SAN).

Illustratively, the memory 520 includes an application/service 522 and an authentication component 524. The authentication component 524 itself includes a nonce generator 526 and barcode generator 528. And the storage 530 includes one or more CA certificates 532 and application data 534. The application/service 522 generally provides one or more software applications and/or computing resources accessed over a network 120 by users. Prior to accessing a given the application/service 522, users may b e required to authenticate themselves using the authentication process described herein. When a user requests access to the application/service 522, nonce generator 526 generates a nonce embedded QR code created by the barcode generator 528. The resulting QR code provides an authentication challenge transmitted to the client requesting access to the computing resources of the application/service 522. The authentication component 528 may then receive a response which includes a copy of the QR code signed using a private key associated with a PKI certificate also included in the response. After the authentication component 528 verifies the signature, the certificate may be validated against CA certificates 532.

Figure 6:
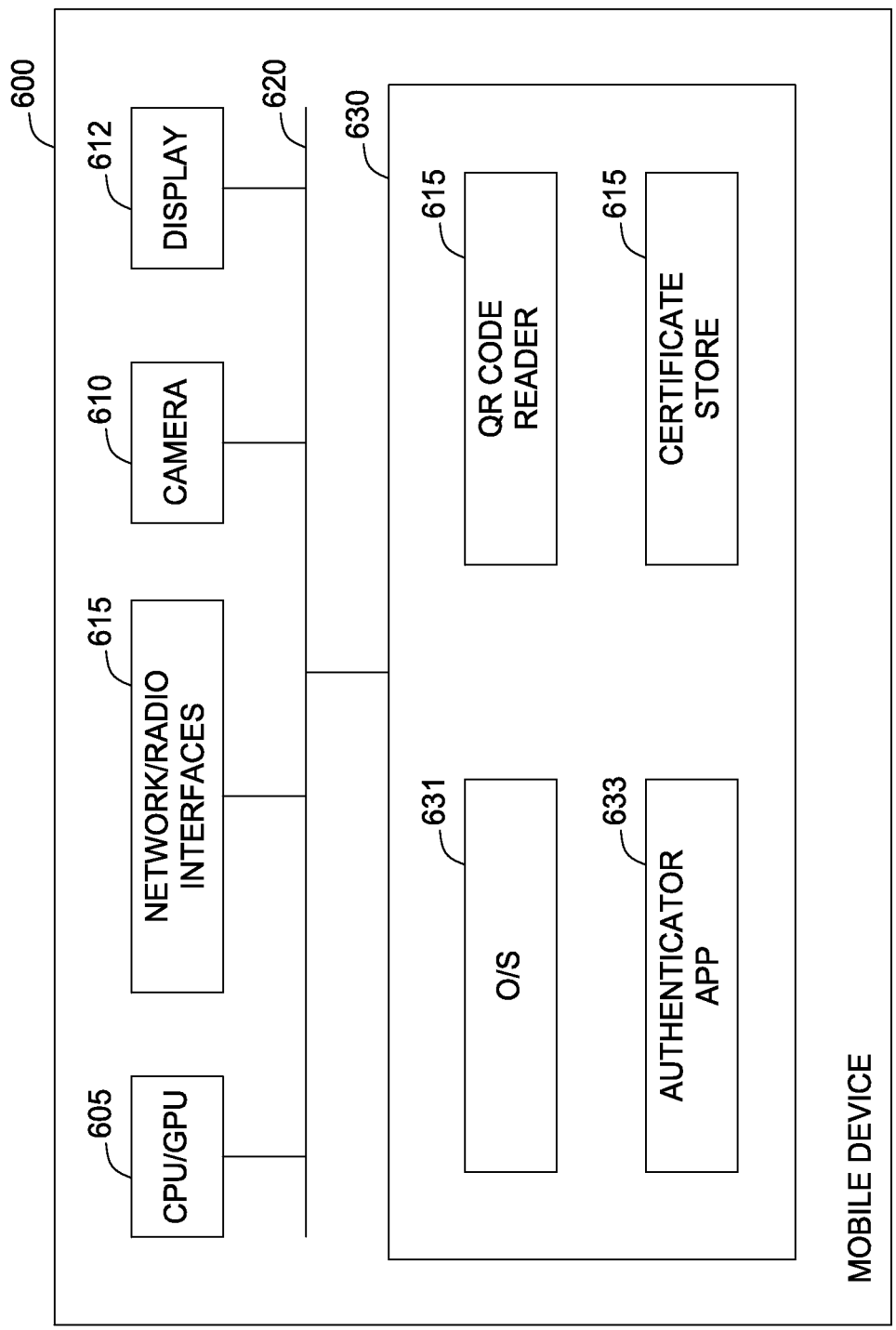
FIG. 6 illustrates an example mobile device storing a certificate used to respond to an authentication challenge, according to one embodiment.

FIG. 6 illustrates an example mobile device 600 storing a certificate used to respond to an authentication challenge encoded in a barcode graphic, e.g., a QR code, according to one embodiment. In this example, device 600 is used to be representative of a mobile telephone (commonly referred to as a Smartphone) with a touch sensitive display 612 and a camera 610. Of course, embodiments of the invention may be adapted for use with a variety of computing devices, including PDAs, handheld video game systems, tablet computers, and other computing devices having a display screen and camera.

As shown, the handheld device 600 includes, without limitation, a central processing unit and graphics processing unit (CPU/GPU) 605, network/radio interfaces 615, an interconnect 620, and a memory 630. Of course, an actual handheld device will include a variety of additional hardware components.

The CPU/GPU 605 retrieves and executes programming instructions stored in the memory 630. Similarly, the CPU/GPU 605 stores and retrieves application data residing in the memory 630. The interconnect 620 is used to transmit instructions and data between the CPU/GPU, storage 630, network interfaces 615, and memory 630. CPU/GPU 605 is included to be representative of a single CPU, multiple CPUs, a single CPU having multiple processing cores, and the like. And the memory 630 is generally included to be representative of memory and storage on a mobile device, e.g., DDR and flash memory spaces.

Illustratively, the memory 630 includes a mobile operating system (O/S) 631, an authenticator app 633, a QR code reader 636, and a certificate store 639. The mobile O/S 631 provides software configured to control the execution of application programs on the handheld device. The authenticator app 633 generally provides a software application configured to respond to an authentication challenge performed to access a networked or distributed software application. For example, the QR code reader 636 may be configured to access the camera 610 to recover the information encoded by a QR code.

As noted, the QR code may encode a nonce and a URL to post a response to the authentication challenge. To generate a response, the authenticator app 633 may access a private key from the certificate store 639, sign the nonce, and post a copy of the nonce, the signature, and a certificate corresponding to the private key to the URL.

Figure 7:
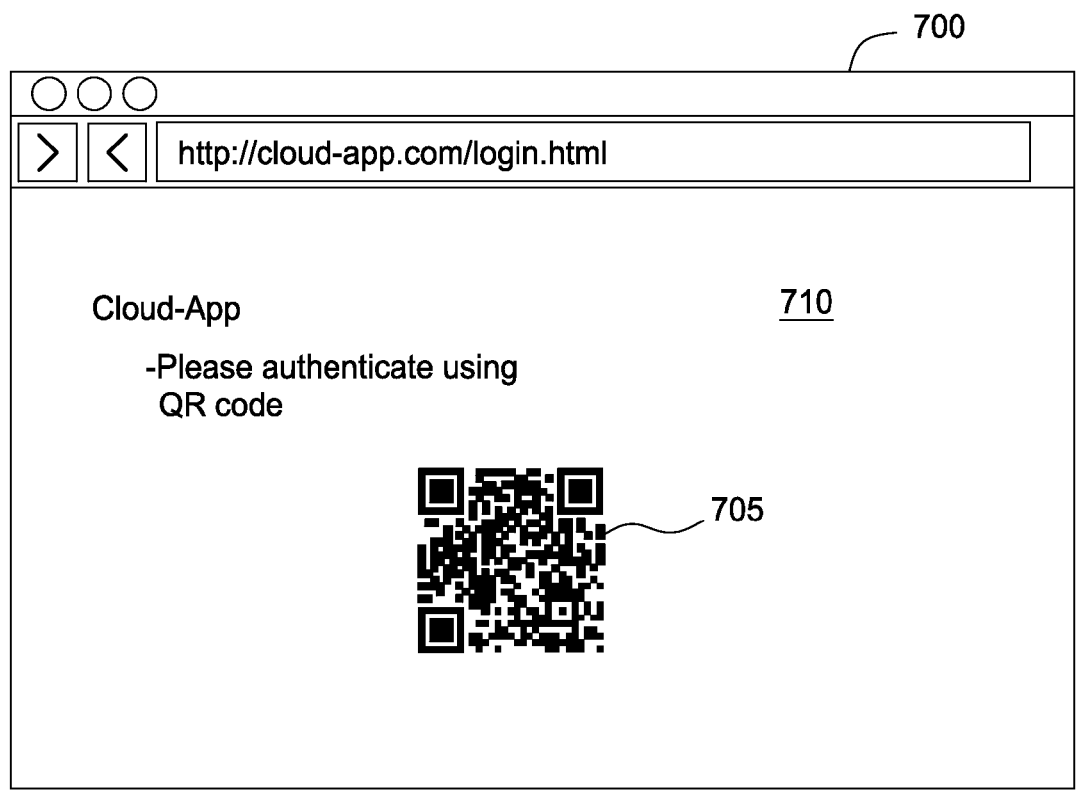
FIG. 7 illustrates an example logon interface for a relying application, according to one embodiment.

FIG. 7 illustrates an example logon interface 700 for a relying application, according to one embodiment. In this example, a user is presumed to have requested access to an application hosted in a computing cloud. In response, the hosted application has transmitted a logon page 710 rendered by a browser on a client device. The logon page 710 includes a QR code 705 encoding an authentication challenge performed before the application will grant the user with access to the hosted application. As described, the user may scan the QR code with a mobile device and use an authenticator app to recover a nonce, sign it using a private key stored on the mobile device, and respond to the authentication challenge encoded by posting the signed nonce to a URL embedded in the QR code.

As described, embodiments presented herein provide techniques for authenticating a user requesting access to a cloud based or hosted application. As part of the authentication process, a relying application presents a challenge by encoding a nonce in a QR code that can be scanned by a mobile device. Advantageously, this approach does not require a computing device to have a correct set of device drivers for a hardware token or installing a copy of a private key on each device used to access the hosted application. Accordingly, embodiments provide an authentication process that allows users to access hosted applications in cases where it is unknown where the users will be accessing the hosted application from or what systems they will be using to access the hosted application.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable storage medium storing instructions, which, when executed on a processor, performs an operation for authenticating a user requesting access to a computing resource, the operation comprising:
   receiving, over a first network connection, a request from a client device to access an application,
   generating, by operation of the processor, a nonce and a network address to encode in a barcode graphic;
   sending, over the first network connection, the barcode graphic to the client device;
   receiving, over a second network connection, a response which includes a digital signature signing the nonce, wherein a mobile device generates the response by:
      scanning the barcode graphic to decode the nonce and to recover the network address,
      accessing a private key from a certificate store on the mobile device, wherein the private key corresponds to a public key identified in a digital certificate associated with the user, wherein the mobile device prompts the user to supply authenticating credentials prior to accessing the private key from the certificate store on the mobile device, and
      signing, with the private key, the decoded nonce; and
   upon determining the digital signature is valid, granting the client device access to the application.

2. A system, comprising:
a processor and
a memory hosting an application, which, when executed on the processor, performs an operation for authenticating a user requesting access to a computing resource, the operation comprising:
   receiving, over a first network connection, a request from a client device to access the application,
   generating, by operation of a processor, a nonce and a network address to encode in a barcode graphic,
   sending, over the first network connection, the barcode graphic to the client device,
   receiving, over a second network connection, a response which includes a digital signature signing the nonce, wherein a mobile device generates the response by:
      scanning the barcode graphic to decode the nonce and to recover the network address;
      accessing a private key from a certificate store on the mobile device, wherein the private key corresponds to a public key identified in a digital certificate associated with the user, wherein the mobile device prompts the user to supply authenticating credentials prior to accessing the private key from the certificate store on the mobile device; and
      signing, with the private key, the decoded nonce, and
   upon determining the digital signature is valid, granting the client device access to the application.

3. The method of claim 1, wherein determining the digital signature is valid comprises determining that the digital signature was generated using the private key corresponding to the public key listed in the digital certificate.

4. The method of claim 3, wherein determining the digital signature is valid further comprises, validating the digital certificate.

5. The method of claim 1, wherein the client device renders the barcode graphic on a display to be scanned by a mobile device.

6. A non-transitory computer-readable storage medium storing instructions, which, when executed on a processor, performs an operation for authenticating a user requesting access to a computing resource, the operation comprising:
   receiving, over a first network connection, a request from a client device to access an application,
   generating, by operation of the processor, a nonce and a network address to encode in a barcode graphic;
   sending, over the first network connection, the barcode graphic to the client device;
   receiving, over a second network connection, a response which includes a digital signature signing the nonce, wherein a mobile device generates the response by:
      scanning the barcode graphic to decode the nonce and to recover the network address,
      accessing a private key from a certificate store on the mobile device, wherein the private key corresponds to a public key identified in a digital certificate associated with the user, wherein the mobile device prompts the user to supply authenticating credentials prior to accessing the private key from the certificate store on the mobile device, and
      signing, with the private key, the decoded nonce; and
   upon determining the digital signature is valid, granting the client device access to the application.

7. The computer-readable storage medium of claim 6, wherein the barcode graphic is a QR code.

8. The computer-readable storage medium of claim 6, wherein determining the digital signature is valid comprises determining that the digital signature was generated using the private key corresponding to the public key listed in the digital certificate.

9. The computer-readable storage medium of claim 8, wherein determining the digital signature is valid further comprises, validating the digital certificate.

10. The computer-readable storage medium of claim 6, wherein the client device renders the barcode graphic on a display to be scanned by a mobile device.

11. A system, comprising:
a processor and
a memory hosting an application, which, when executed on the processor, performs an operation for authenticating a user requesting access to a computing resource, the operation comprising:
   receiving, over a first network connection, a request from a client device to access the application,
   generating, by operation of a processor, a nonce and a network address to encode in a barcode graphic,
   sending, over the first network connection, the barcode graphic to the client device,
   receiving, over a second network connection, a response which includes a digital signature signing the nonce, wherein a mobile device generates the response by:
      scanning the barcode graphic to decode the nonce and to recover the network address;
      accessing a private key from a certificate store on the mobile device, wherein the private key corresponds to a public key identified in a digital certificate associated with the user, wherein the mobile device prompts the user to supply authenticating credentials prior to accessing the private key from the certificate store on the mobile device; and
      signing, with the private key, the decoded nonce, and
   upon determining the digital signature is valid, granting the client device access to the application.

12. The system of claim 11, wherein the barcode graphic is a QR code.

13. The system of claim 11, wherein determining the digital signature is valid comprises determining that the digital signature was generated using the private key corresponding to the public key listed in the digital certificate.

14. The system of claim 13, wherein determining the digital signature is valid further comprises, validating the digital certificate.

15. The system of claim 11, wherein the client device renders the barcode graphic on a display to be scanned by a mobile device.

16. A method for accessing a computing resource hosted by a network accessible computing system, the method comprising:
   receiving, on a first computing device, an authentication challenge, wherein the authentication challenge is received in response to a request to access the computing resource, and wherein the authentication challenge is encoded in a barcode graphic displayed on the first computing device
   scanning, with a second computing device, the barcode graphic to recover a nonce and a network address encoded in the barcode graphic;
   retrieving a private key from a certificate store on the second computing device, wherein the private key corresponds to a public key identified in a digital certificate;
   signing the recovered nonce with the the private key retrieved from a certificate store on the second computing device, wherein the second computing device prompts a user to supply authenticating credentials prior to retrieving the private key from the certificate store on the second computing device; and posting, from the second computing device, to the network address, a response to the authentication challenge, wherein the response includes at least a signed copy of the nonce.

17. The method of claim 16, wherein the second computing device is a handheld mobile telephone and wherein the response further includes a digital certificate identifying a user and a public key corresponding to the private key used to sign the nonce.

18. The method of claim 16, wherein the barcode graphic is a QR code.

19. A non-transitory computer-readable storage medium storing instructions, which, when executed on a processor on a mobile device, performs an operation for responding to an authentication challenge, the operation comprising:

scanning a barcode graphic displayed on a logon page of an application to recover a nonce and a network address;

prompting a user to supply authenticating credentials;

in response to receiving the authenticating credentials from the user, retrieving a private key from a certificate store on the mobile device, wherein the private key corresponds to a public key identified in a digital certificate associated with the use;

signing the recovered nonce with the private key stored on the mobile device; and posting, to the network address, a response to the authentication challenge, wherein the response includes at least a copy of the nonce digitally signed with the private key retrieved from the certificate store on the mobile device.

* * * * *

UNITED STATES PATENT AND TRADEMARK OFFICE
CERTIFICATE OF CORRECTION

PATENT NO. : 9,083,531 B2  
APPLICATION NO. : 13/652575  
DATED : July 14, 2015  
INVENTOR(S) : Srinivas Cheena Page 1 of 1

It is certified that error appears in the above-identified patent and that said Letters Patent is hereby corrected as shown below:

In the Claims:

Column 9, Claim 2, Lines 1-28, please delete "A system, comprising: a processor and a memory hosting an application, which, when executed on the processor, performs an operation for authenticating a user requesting access to a computing resource, the operation comprising: receiving, over a first network connection, a request from a client device to access the application, generating, by operation of a processor, a nonce and a network address to encode in a barcode graphic, sending, over the first network connection, the barcode graphic to the client device, receiving, over a second network connection, a response which includes a digital signature signing the nonce, wherein a mobile device generates the response by: scanning the barcode graphic to decode the nonce and to recover the network address; accessing a private key from a certificate store on the mobile device, wherein the private key corresponds to a public key identified in a digital certificate associated with the user, wherein the mobile device prompts the user to supply authenticating credentials prior to accessing the private key from the certificate store on the mobile device; and signing, with the private key, the decoded nonce, and upon determining the digital signature is valid, granting the client device access to the application."

and insert -- The method of claim 1, wherein the barcode graphic is a QR code. -- therefor;

Column 10, Claim 16, Line 64, please delete "the" after the.

Signed and Sealed this  
Twelfth Day of January, 2016

Michelle K. Lee  
*Director of the United States Patent and Trademark Office*